US009764804B1

(12) United States Patent
Kennamer, Sr.

(10) Patent No.: US 9,764,804 B1
(45) Date of Patent: Sep. 19, 2017

(54) OCEAN PLATFORM

(71) Applicant: Paul D. Kennamer, Sr., Grant, AL (US)

(72) Inventor: Paul D. Kennamer, Sr., Grant, AL (US)

(\*) Notice: Subject to any disclaimer, the term of this patent is extended or adjusted under 35 U.S.C. 154(b) by 0 days.

(21) Appl. No.: 14/980,331

(22) Filed: Dec. 28, 2015

Related U.S. Application Data

(60) Provisional application No. 62/096,853, filed on Dec. 24, 2014.

(51) Int. Cl.
| | |
|---|---|
| *B63B 35/44* | (2006.01) |
| *E01D 15/14* | (2006.01) |
| *E02B 9/08* | (2006.01) |
| *F03B 13/20* | (2006.01) |
| *B63B 1/10* | (2006.01) |

(52) U.S. Cl.
CPC .............. *B63B 35/44* (2013.01); *B63B 1/107* (2013.01); *B63B 35/4413* (2013.01); *E01D 15/14* (2013.01); *E02B 9/08* (2013.01); *F03B 13/20* (2013.01); *B63B 2035/442* (2013.01); *B63B 2035/4466* (2013.01)

(58) Field of Classification Search
CPC .............. B63B 35/44; B63B 2035/442; B63B 2035/4466; B63B 2001/044; B63B 1/107; F03B 13/20; E01D 15/14; E02B 9/08
See application file for complete search history.

(56) References Cited

U.S. PATENT DOCUMENTS

| | | | | |
|---|---|---|---|---|
| 6,241,425 | B1* | 6/2001 | Kazim | B63B 21/502 |
| | | | | 405/200 |
| 6,761,124 | B1* | 7/2004 | Srinivasan | B63B 35/4413 |
| | | | | 114/264 |
| 7,963,241 | B2* | 6/2011 | Srinivasan | B63B 9/065 |
| | | | | 114/267 |
| 7,985,108 | B1* | 7/2011 | Bekker | B63B 1/107 |
| | | | | 114/144 B |
| 8,080,894 | B2* | 12/2011 | Rourke | F03B 13/20 |
| | | | | 290/52 |
| 9,181,922 | B2* | 11/2015 | Dib Echeverria | F03B 13/186 |
| 9,476,411 | B2* | 10/2016 | Gaigler | F16L 1/23 |
| 2015/0166149 | A1* | 6/2015 | Vandenworm | B63B 35/44 |
| | | | | 114/265 |

FOREIGN PATENT DOCUMENTS

DE    102010012306 A1 * 9/2011 ............. B63B 27/30

OTHER PUBLICATIONS

English machine translation of DE102010012306, Sep. 2011, Germany, Nedreu Ooszef.*

\* cited by examiner

*Primary Examiner* — Michael Zarroli
(74) *Attorney, Agent, or Firm* — James Richards

(57) ABSTRACT

A floating ocean platform stabilized in position by energy produced from wave energy. In one embodiment, the platform may be used to support a roadway to build a floating bridge. The platform may also include a wave break mechanism for additional stability and may submerge for storm survival. The platform may be constructed in modules to permit reconfiguration and management of resources. In other embodiments, the platform may support communities. The bridge may also provide transmission lines for conducting wave generated electricity back to the mainland.

15 Claims, 3 Drawing Sheets

OCEAN PLATFORM

RELATED APPLICATIONS

This application claims the benefit under 35 USC 119(e) of U.S. Provisional Application 62/096,853 titled "Ocean Platform", filed Dec. 24, 2014 by Kennamer, which is incorporated herein by reference in its entirety.

TECHNICAL FIELD

The present invention pertains generally to the field of oceanic structures, more particularly, to floating structures.

BACKGROUND

Brief Description

Briefly, the present disclosure pertains generally to an ocean platform capable of providing multiple features and benefits. The platform is a floating platform stabilized in position by energy produced from wave energy. In one embodiment, the platform may be used to support a roadway to build a floating bridge. The platform may also include a wave break mechanism for additional stability and may submerge for storm survival. The platform may be constructed in modules to permit reconfiguration and management of resources. In other embodiments, the platform may support communities. The bridge may also provide transmission lines for conducting wave generated electricity back to the mainland.

In various variations, the platform may be a stabilized ocean platform comprising a deck, and a deck support structure supporting the deck, a plurality of vertical ballast tanks attached to said deck support structure, the vertical ballast tanks providing flotation for said deck support structure and capable of floating said deck above a water surface.

Further, the vertical ballast tanks may be coupled to wave coupling floats movable relative to said ballast tanks, and said wave coupling floats movable vertically responsive to wave motion. The vertical motion may be coupled to a generator configured to generate electrical energy responsive to the vertical motion.

Further, an energy storage unit in the stabilized ocean platform may be coupled to the generator for receiving and storing the electrical energy.

A navigation unit may be provided capable of determining a position of said stabilized ocean platform.

A stabilizer may be provided comprising at least one axis of thrust for stabilizing a position of the stabilized ocean platform. The stabilizer may be powered from the energy storage unit.

A controller may be provided responsive to the navigation unit and configured for controlling the stabilizer to maintain a stabilized position of the stabilized platform.

Further, the stabilized platform may include a wave modifier comprising a structure deployed in a path of an incoming wave to reduce wave amplitude during high seas to prevent damage to said wave coupling floats.

The wave modifier may comprise a vertical tapered structure having a narrow top and a wider base configured for storage below the waves and during operation raised to the wave surface to interfere with the waves and reduce wave amplitude arriving at the wave coupling floats The wave modifier may comprise a hollow structure capable of being filled with an adjustable amount of ballast to float the wave modifier at a desired level. The hollow structure comprises a shell comprising concrete.

The stabilized platform may be configured to be linked together with one or more additional platforms to form a highway or a structure supporting dwellings for a community.

The stabilized platform may be configured to be submerged below sea level for storm survival. The vertical ballast tanks may be configured to contain variable ballast to submerge and stabilize said stabilized platform below the waves for storm survival. The stabilized platform may include a compressed air system comprising a compressor and a compressed air tank to re-inflate the ballast tanks to float the platform above the sea surface.

The stabilized platform may include a sea anchor for additional stabilization.

The stabilizer may comprises at least one propeller thruster or jet thruster.

The disclosure further relates to associated methods.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention relates to a floating platform to be deployed at sea that may remain in a fixed position indefinitely, relying on wave energy to provide the power to maintain position of the platform. The wave energy may also produce excess power. The excess power may be used on the platform for other uses, for example to serve a community, for industrial manufacturing, for lighting, desalination of water, for office use or any other on site use. In one embodiment, multiple platforms may be joined together to form a bridge or highway across the ocean. The platform, being self sufficient and self stabilized, may be used to build highways across great expanses of the ocean or even to join continents. Along the way, there may be rest stops, which may grow to small communities to provide services necessary for the rest stops—gas stations, restaurants, hotels, plumbers, electricians, laundries an so on to include services needed by the services. In addition, manufacturing or other industry may be attracted to the presence of excess electrical power. Transmission to the mainland may be costly and direct on site use may be most economical.

The platform may have additional features for survival at sea. The platform may be provided with a system of wave controllers to moderate the power of the waves in high seas. The wave controllers may be large concrete structures that may be lowered below the waves or raised to the wave surface to break up wave energy as needed. In addition, the platform may be submersible in the event of a hurricane or other severe weather. When severe weather is anticipated, ballast tanks may be filled and the platform lowered below the wave action.

In one embodiment, the platform is a highly stabilized platform. For applications forming an extensive platform, for example, a highway, multiple platforms may be combined to form the highway. The roadway on top should be as stable as practical. Vehicles cannot maintain stable operation at top speed when the roadway beneath them is moving back and forth even just a few inches. Thus, the platform may include thrusters capable of thrusting in lateral, vertical, and rotational axes to stabilize the platform. Radio Frequency and inertial reference sensors may be used to sense platform motion to stabilize the platform.

Figure 1:
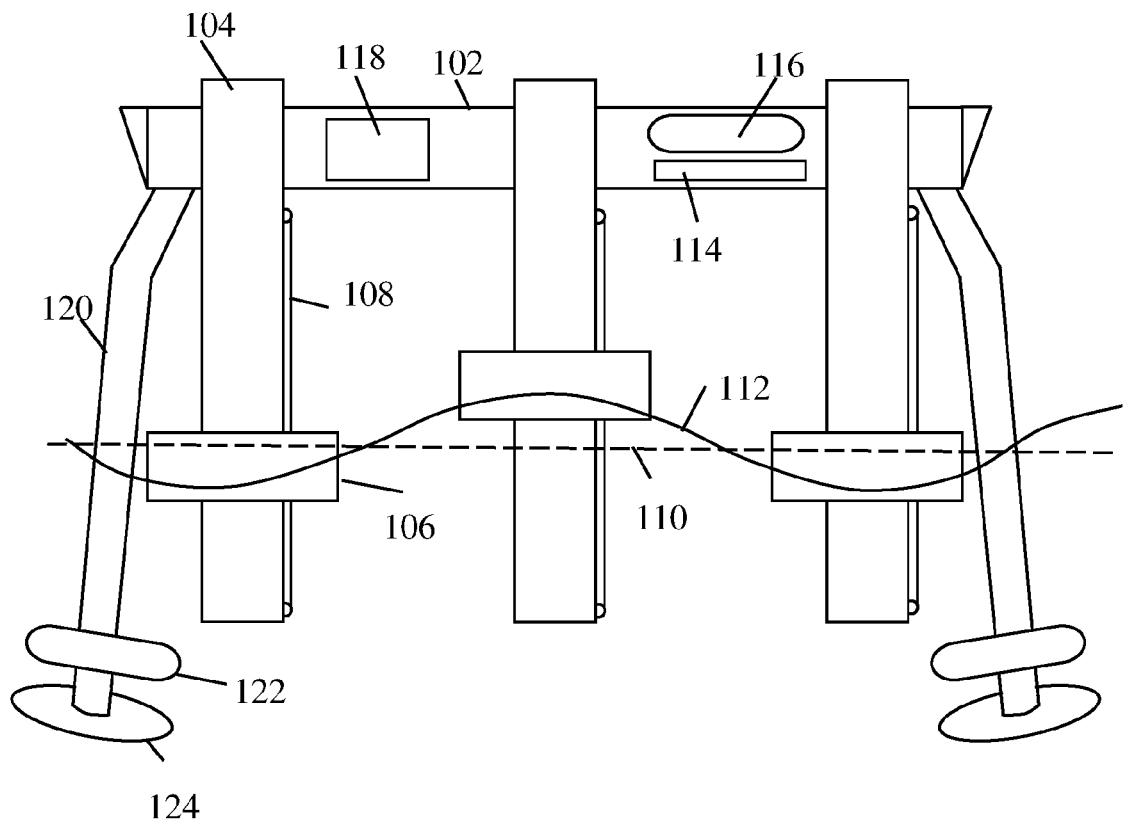
FIG. 1 shows a side view of an exemplary platform.
Figure 2:
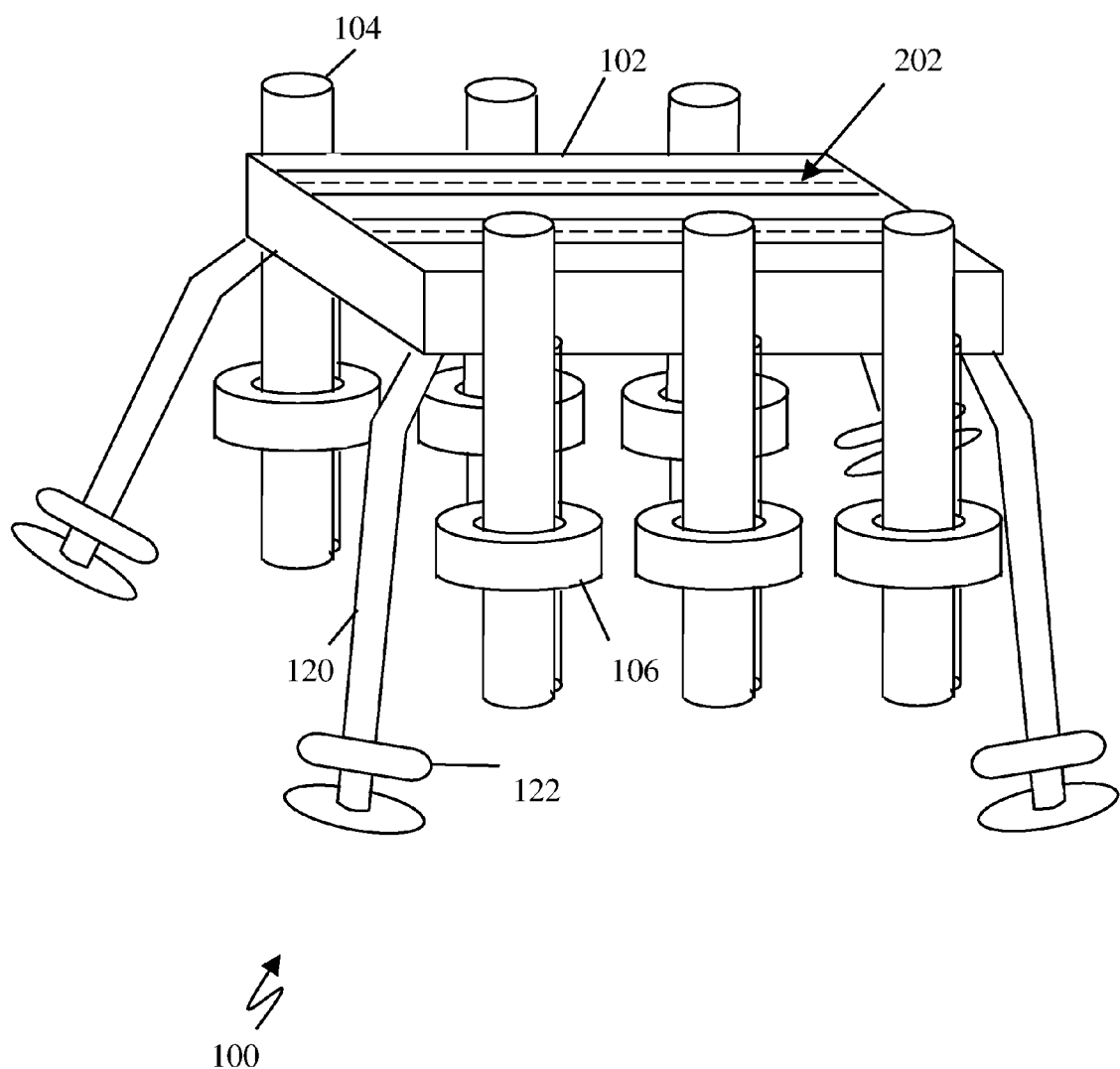
FIG. 2 shows an isometric view of the platform of FIG. 1.

FIG. 1 shows a side view of an exemplary platform. Referring to FIG. 1, the platform comprises a platform deck section 102, floating support columns 104, wave coupling floats 106, and a stabilizer arm 120. The platform deck section 102 supports a top surface, which may support numerous usages, including roadway (FIG. 2, 202), park, rest area, agriculture, wind farm, and industrial usage. A four lane roadway example is shown in FIG. 2, 202. Below the top deck, the platform deck section may support machinery and interior space as desired. The interior may include batteries 114, generators, compressors and compressed air tanks 116. The interior may also include office space, utility rooms, control equipment 118, navigation equipment, and other functions as necessary.

The floating support columns 104 are rigid columns with compartments usable as ballast tanks. The floating support columns may also house compressors, compressed air tanks, generators and other equipment.

Exemplary wave coupling (riding) floats 106 are shown surrounding the floating support columns 104. The wave riding floats 106 move up and down according to wave action. The up and down motion is coupled to a generator using exemplary cable coupling 108 as shown. Other coupling methods may be used. The three wave riding floats are shown responding to a wave 112 relative to mean sea level 110. Other systems for wave energy conversion may be used. Generated power may be stored in the battery 114. Excess power may be distributed to the shore or to other platforms, or used to support industrial functions on the platform, if so configured. The power is also used to stabilize the platform 100.

The stabilizer arm 120 extends from the platform deck 102 to deeper ocean, preferably below the principle wave action region that drives the wave coupling floats—i.e., preferably below ½ wavelength (wave height), more preferably below 1 wavelength (wave height) referred to the nominal design wave for the platform, for example 30 feet (10 meters) for typical seas. The stabilizer arm 120 may include thrusters 122 capable of thrusting vertically and horizontally to move the platform in any direction or orientation. The thrusters should be capable of high frequency servo performance to respond to disturbances and maintain the platform at a precision location with precision stability. The thrusters may be propeller or jet pump driven or other type of thruster. The thruster control may also be used with additional servo mounts for the roadway for precision control. In addition, a sea anchor 124 may be used for additional stability. The sea anchor may be articulating to adjust for sea and current states.

The platform controller 118 may stabilize the platform based on a number of available navigation and stabilization sources included in the controller, including but not limited to GPS, LORAN, satellite, and dedicated ground based positioning systems tailored to the platform application. The navigation and stabilization system may include inertial sensors including accelerometers and gyros, inclinometers and other sensors.

Configurations

The platform may be configured for numerous applications. As a roadway, the sections may be linked end to end. A flexible joint may be used with a pivot at the roadway surface to allow for some variation in position as each section maneuvers to maintain position.

For a long roadway, it may be desirable to provide a rest stop. The rest stop may be built by linking platforms end to end and side to side. In addition, some platforms may be constructed as double deck platforms. The rest stops may also provide gas stations, restaurants and other services.

Since the bridge is at water level, it may block the passage of ships or boats of any size. Thus, sections may be adapted to disconnect and move laterally to form a horizontal drawbridge—allowing the passage of ships. After the passage of ships, the sections may be joined again to form the roadway.

The platforms may be made substantially identical for ease of maintenance. A defective section may be removed and a replacement section maneuvered into place. The defective section may then be returned to a service dock for repair.

Storms

The platform may be operable over a wide range of wave heights and wave lengths; however, the sea can deliver waves and winds to exceed most any given design maximum. In the case of a severe storm, the platform may be adapted to be submergible. The vertical tanks may be filled with water to the point where the platform can submerge below the most severe wave action, for example, ½ to 1 wave length below the average surface, for example 90 feet (30 meters) deep for hurricane winds.

Wave Modifier

In one variation, the platform may be protected by a wave modifier. One exemplary wave modifier is shown in FIG. 3. The wave modifier is a device that can provide adjustable attenuation for incoming waves to prevent overload and possible damage to the platform and wave energy conversion system. For sea states that are too large for the wave energy conversion system to handle, the wave modulator may reduce the size of the waves reaching the platform. For example, the wave modifier may be greater than 30 feet (10 meters) in height, or preferably greater than 60 feet (20 meters). For sea states too large for the wave modifier, the platform may retreat by submerging below the waves.

Figure 3A:
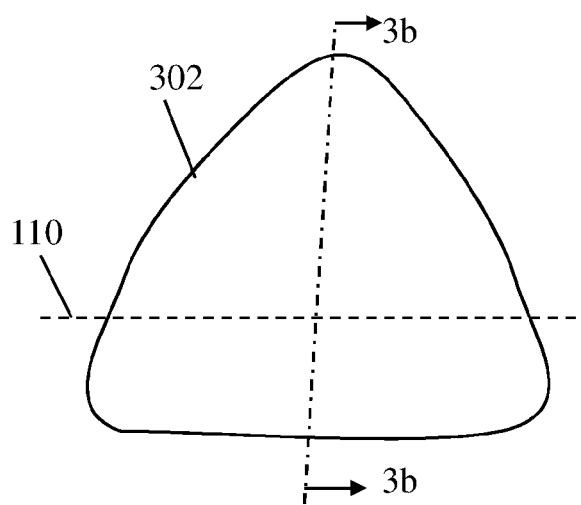
FIG. 3a and FIG. 3b show two views of an exemplary wave modifier.
Figure 3B:
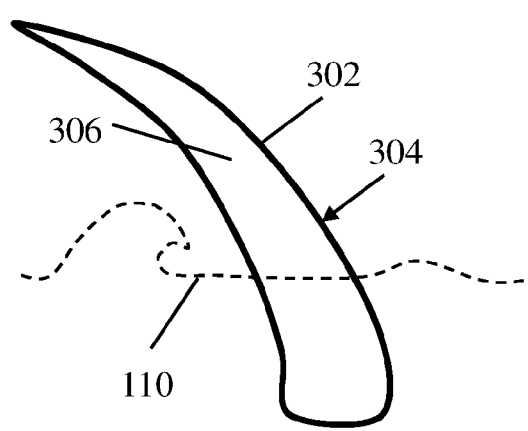

FIG. 3a and FIG. 3b show two views of an exemplary wave modifier. FIG. 3a shows a wave front view, showing the side facing the oncoming waves. FIG. 3b shows a side cross section identified in FIG. 3a. Referring to FIG. 3a and FIG. 3b, the wave modifier 302 may be a shell 304 having a hollow interior 306, possibly fabricated of concrete in the manner of a concrete boat hull, for example concrete and steel mesh. The shell may be fillable with water or air to float the shell at a desired height. If the shell is below the waves, there is no effect on the waves. As the shell is floated higher a larger and larger portion of the shell is at the water line 110 and interfering with the waves, dissipating and reflecting wave energy.

As shown, the exemplary wave modifier may have a substantially triangular face view, having a wide base tapering to a narrow top. The vertices may be rounded. The side view may be tilted toward the oncoming wave by an angle, for example zero to 45 degrees. The top may be curved toward an oncoming wave.

In Operation

In operation, the platform is established in a desired height and level configuration by inflation of the vertical ballast tanks. Once a rough level is obtained, the stabilization thrusters may be engaged to achieve and maintain precision stabilization. If a steady bias is noted in the vertical stabilization control, the ballast may be adjusted to neutralize the bias.

The wave coupling floats move vertically in response to wave action. The floats are coupled to a generator that generates electricity. The electricity is stored in the batteries and/or delivered for use. In particular, the power is delivered as necessary to the stabilization system to maintain the platform at the desired position and orientation.

As the seas increase in magnitude, it may be necessary to deploy the wave modifier system. The wave modifiers are raised into the wave region and act to attenuate the waves. As the waves get stronger, the wave modifiers may be raised further to further attenuate the waves. If the waves get stronger than can be attenuated by the wave modifiers, the platform may be submerged. The ballast tanks are filled and the platform submerges to a depth as necessary for survival in the presence of the waves. The wave modifiers may then be retracted (submerged) to protect them form the storm. Once the storm has passed, the ballast tanks may be drained using the compressed air previously stored. Once the platform is established again on top, normal operations may resume.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A stabilized ocean platform comprising:
    a deck, and
    a deck support structure supporting said deck;
    a plurality of vertical ballast tanks attached to said deck support structure, said vertical ballast tanks providing flotation for said deck support structure and capable of floating said deck above a water surface;
    said vertical ballast tanks coupled to wave coupling floats movable relative to said ballast tanks, and wave coupling floats movable vertically responsive to wave motion, said vertical motion coupled to a generator configured to generate electrical energy responsive to said vertical motion;
    an energy storage unit in said stabilized ocean platform coupled to said generator for receiving and storing said electrical energy;
    a navigation unit capable of determining a position of said stabilized ocean platform;
    a stabilizer comprising at least one axis of thrust for stabilizing a position of said stabilized ocean platform; said stabilizer powered from said energy storage unit;
    a controller responsive to said navigation unit and configured for controlling said stabilizer to maintain a stabilized position of said stabilized platform.

2. The stabilized platform in accordance with claim 1, further including a wave modifier comprising a structure deployed in a path of an incoming wave to reduce wave amplitude during high seas to prevent damage to said wave coupling floats.

3. The stabilized platform in accordance with claim 2, wherein the wave modifier comprises a vertical tapered structure having a narrow top and a wider base configured for storage below the waves and during operation raised to the wave surface to interfere with the waves and reduce wave amplitude arriving at the wave coupling floats.

4. The stabilized platform in accordance with claim 3, wherein the wave modifier comprises a hollow structure capable of being filled with an adjustable amount of ballast to float the wave modifier at a desired level.

5. The stabilized platform in accordance with claim 4, wherein the hollow structure comprises a shell comprising concrete.

6. The stabilized platform in accordance with claim 5, wherein the hollow structure has a height of at least 10 meters.

7. The stabilized platform in accordance with claim 1, wherein the stabilized platform is configured to be linked together with one or more additional platforms to form a highway.

8. The stabilized platform in accordance with claim 1, wherein the stabilized platform is configured to be linked together with one or more additional platforms to form a structure supporting dwellings for a community.

9. The stabilized platform in accordance with claim 1, wherein the stabilized platform is configured to be submerged below sea level for storm survival.

10. The stabilized platform in accordance with claim 9, wherein said vertical ballast tanks are configured to contain variable ballast to submerge and stabilize said stabilized platform below the waves for storm survival; said stabilized platform further comprising a compressed air system comprising a compressor and a compressed air tank to re-inflate said ballast tanks to float said platform above the sea surface.

11. The stabilized platform in accordance with claim 1, further including a sea anchor for additional stabilization.

12. The stabilized platform in accordance with claim 1, wherein the stabilizer comprises at least one propeller thruster.

13. A method for providing a stabilized ocean platform comprising:
    providing a deck, and a deck support structure supporting said deck;
    attaching a plurality of vertical ballast tanks to said deck support structure,
    said vertical ballast tanks providing flotation for said deck support structure and capable of floating said deck above a water surface;
    coupling said vertical ballast tanks to flotation tanks movable relative to said ballast tanks, and said flotation tanks movable vertically responsive to wave motion,
    coupling said motion of said flotation tanks to a generator;
    said generator generating electrical energy responsive to said vertical motion;
    coupling and storing said electrical energy in an energy storage unit in said stabilized ocean platform;

providing a navigation unit capable of determining a position of said stabilized ocean platform;

coupling a stabilizer to said stabilized platform, said stabilizer comprising at least one axis of thrust for stabilizing a position of said stabilized ocean platform;

powering said stabilizer from said energy storage unit;

providing a controller responsive to said navigation unit; said controller controlling said stabilizer to maintain a stabilized position of said stabilized platform.

14. The method in accordance with claim 13, further including deploying a wave modifier in a path of an incoming wave to reduce wave amplitude during high seas to prevent damage to said wave flotation tanks.

15. The method in accordance with claim 14, wherein the wave modifier comprises a vertical tapered structure having a narrow top and a wider base configured for storage below the waves and during operation raised to the wave surface to interfere with the waves and reduce wave amplitude arriving at the wave flotation tanks.

\* \* \* \* \*